United States Patent
Yung et al.

(10) Patent No.: US 11,966,614 B2
(45) Date of Patent: *Apr. 23, 2024

(54) OBJECT TIERING IN A DISTRIBUTED STORAGE SYSTEM

(71) Applicant: NetApp, Inc., San Jose, CA (US)

(72) Inventors: Alvis Yung, Vancouver (CA); Song Guen Yoon, Vancouver (CA); Raymond Yu Shun Mak, Vancouver (CA); Chia-Chen Chu, Vancouver (CA); Dheeraj Sangamkar, Vancouver (CA); Robin Mahony, Vancouver (CA)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,133

(22) Filed: Jul. 21, 2022

(65) Prior Publication Data

US 2022/0357870 A1 Nov. 10, 2022

Related U.S. Application Data

(63) Continuation of application No. 16/799,687, filed on Feb. 24, 2020, now Pat. No. 11,416,156.

(51) Int. Cl.
| | |
|---|---|
| *G06F 12/00* | (2006.01) |
| *G06F 3/06* | (2006.01) |
| *G06F 11/14* | (2006.01) |
| *G06F 13/00* | (2006.01) |

(52) U.S. Cl.
CPC .......... *G06F 3/0647* (2013.01); *G06F 3/0617* (2013.01); *G06F 3/0653* (2013.01); *G06F 3/0659* (2013.01); *G06F 3/067* (2013.01); *G06F 11/1464* (2013.01); *G06F 11/1469* (2013.01)

(58) Field of Classification Search
CPC .... G06F 3/0647; G06F 3/0617; G06F 3/0653; G06F 3/0659; G06F 3/067; G06F 11/1464; G06F 11/1469
USPC ........................................................ 711/154
See application file for complete search history.

(56) References Cited

U.S. PATENT DOCUMENTS

| | | | | |
|---|---|---|---|---|
| 5,924,074 | A | 7/1999 | Evans | |
| 7,047,386 | B1 * | 5/2006 | Ngai | ..................... G06F 9/5016 |
| | | | | 711/170 |
| 8,041,907 | B1 * | 10/2011 | Wu | ..................... G06F 11/1453 |
| | | | | 707/648 |
| 8,578,490 | B2 * | 11/2013 | Moran | ................ H04L 63/1425 |
| | | | | 707/669 |

(Continued)

*Primary Examiner* — Sheng Jen Tsai
(74) *Attorney, Agent, or Firm* — Haynes and Boone, LLP

(57) ABSTRACT

A system, method, and machine-readable storage medium for restoring a data object for a specified active time period are provided. In some embodiments, the method includes receiving, by a storage device from a client, a request specifying an active time period for a data object to remain stored on an accessible tier. The method also includes determining, by the storage device, that the active time period has elapsed. The method further includes responsive to a determination that the active time period has elapsed, sending, by the storage device, a request to a server storing the data object to move the data object from the accessible tier to an archive tier. Data objects that are stored on the accessible tier are accessible by the client, and data objects that are stored on the archive tier are inaccessible by the client.

21 Claims, 5 Drawing Sheets

(56) References Cited

U.S. PATENT DOCUMENTS

| | | | |
|---|---|---|---|
| 8,782,009 B2* | 7/2014 | Shaath | G06F 16/125 707/661 |
| 10,042,718 B1* | 8/2018 | Donlan | G06F 11/1451 |
| 10,438,017 B2* | 10/2019 | Barday | H04L 67/52 |
| 10,459,648 B1* | 10/2019 | Menezes | G06F 3/0619 |
| 10,509,920 B2* | 12/2019 | Barday | G06F 16/113 |
| 10,565,161 B2* | 2/2020 | Barday | G06F 15/76 |
| 10,649,860 B2* | 5/2020 | Sarafijanovic | G06F 3/0605 |
| 10,725,965 B1* | 7/2020 | Rokicki | G06F 16/00 |
| 10,783,113 B2* | 9/2020 | Shorten | G06F 16/125 |
| 10,803,200 B2* | 10/2020 | Barday | G06F 16/1734 |
| 10,884,836 B2* | 1/2021 | Yamada | G06F 11/27 |
| 11,416,156 B2 | 8/2022 | Yung et al. | |
| 2001/0052058 A1* | 12/2001 | Ohran | G06F 11/2074 714/E11.107 |
| 2003/0204420 A1* | 10/2003 | Wilkes | A47B 81/00 705/3 |
| 2004/0015561 A1* | 1/2004 | Mayhew | G06F 13/4252 709/217 |
| 2005/0149584 A1* | 7/2005 | Bourbonnais | G06F 16/256 |
| 2007/0157315 A1* | 7/2007 | Moran | H04L 63/1425 726/23 |
| 2008/0034018 A1* | 2/2008 | Cisler | G06F 3/04847 715/764 |
| 2008/0154777 A1* | 6/2008 | Achiwa | G06F 11/1096 705/51 |
| 2008/0235304 A1* | 9/2008 | Fujii | G06F 3/0643 |
| 2008/0263112 A1* | 10/2008 | Shaath | G06F 16/125 |
| 2010/0299763 A1* | 11/2010 | Marcus | G06Q 10/06 726/30 |
| 2012/0150814 A1* | 6/2012 | Vijayan Retnamma | G06F 11/1469 707/674 |
| 2012/0212850 A1* | 8/2012 | Haustein | G11B 27/11 360/39 |
| 2012/0254119 A1* | 10/2012 | Kumarasamy | G06F 11/1464 707/646 |
| 2013/0339298 A1* | 12/2013 | Muller | G06F 16/16 707/640 |
| 2014/0006354 A1* | 1/2014 | Parkison | G06F 16/183 707/661 |
| 2014/0032600 A1* | 1/2014 | Sarferaz | G06F 16/00 707/E17.005 |
| 2014/0181395 A1* | 6/2014 | Vincent | G06F 3/0605 711/111 |
| 2014/0181396 A1* | 6/2014 | Vincent | G06F 3/0689 711/111 |
| 2016/0004708 A1* | 1/2016 | Takaoka | G06F 16/1734 707/667 |
| 2016/0364395 A1* | 12/2016 | Shorten | G06F 16/113 |
| 2017/0091479 A1* | 3/2017 | Pluder | G06F 21/6245 |
| 2019/0073275 A1* | 3/2019 | Sarafijanovic | G06F 3/0685 |
| 2019/0179799 A1* | 6/2019 | Barday | H04L 67/568 |
| 2019/0180050 A1* | 6/2019 | Barday | H04L 67/1097 |
| 2019/0180052 A1* | 6/2019 | Barday | H04L 67/51 |
| 2020/0117829 A1* | 4/2020 | Barday | G06F 21/6245 |
| 2020/0167091 A1* | 5/2020 | Haridas | G06F 3/067 |
| 2020/0167240 A1* | 5/2020 | Haridas | G06F 11/1453 |
| 2020/0396193 A1* | 12/2020 | Mayers | G06F 3/04883 |
| 2020/0410418 A1* | 12/2020 | Martynov | G06F 11/1461 |
| 2021/0173811 A1* | 6/2021 | Agrawal | G06F 3/065 |

\* cited by examiner

OBJECT TIERING IN A DISTRIBUTED STORAGE SYSTEM

CROSS-REFERENCE TO RELATED APPLICATIONS

The present application is a continuation of U.S. patent application Ser. No. 16/799,687, filed Feb. 24, 2020, the disclosure of which is hereby incorporated herein by reference in its entirety.

TECHNICAL FIELD

The present description relates to the tiering of objects, and more specifically, to a system, method, and machine-readable storage medium for tiering objects in a distributed storage system for cost savings, disaster recovery, and/or cost management.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers to provide data and manage its flow. Improvements in distributed storage have given rise to a cycle where applications demand increasing amounts of data delivered with reduced latency, greater reliability, and greater throughput. Hand-in-hand with this trend, system administrators have taken advantage of falling storage prices to add capacity wherever possible.

One approach involves tiering to cloud storage arrays of varying accessibility speeds. Slower speeds provide reduced cost, but at higher latency (i.e., delay to client requests). Some cloud providers may provide a plurality of storage tiers to clients for data storage, with each storage tier having a different quality of service and/or cost associated with the data storage. For example, data stored on a first storage tier offered by a cloud provider may be accessible to the client, while data stored on a second storage tier offered by the cloud provider may be inaccessible to the client. If the client desires to retrieve data stored on the second storage tier, the client may request for the data to be restored to the first storage tier, where the client may access the data. The first storage tier may be associated with a higher cost than the second storage tier. While tiering can provide cost benefits, current approaches have limitations in their ability for providing cost savings to clients storing content in the distributed storage system.

BRIEF DESCRIPTION OF THE DRAWINGS

The present disclosure is best understood from the following detailed description when read with the accompanying figures.

DETAILED DESCRIPTION

Figure 1:
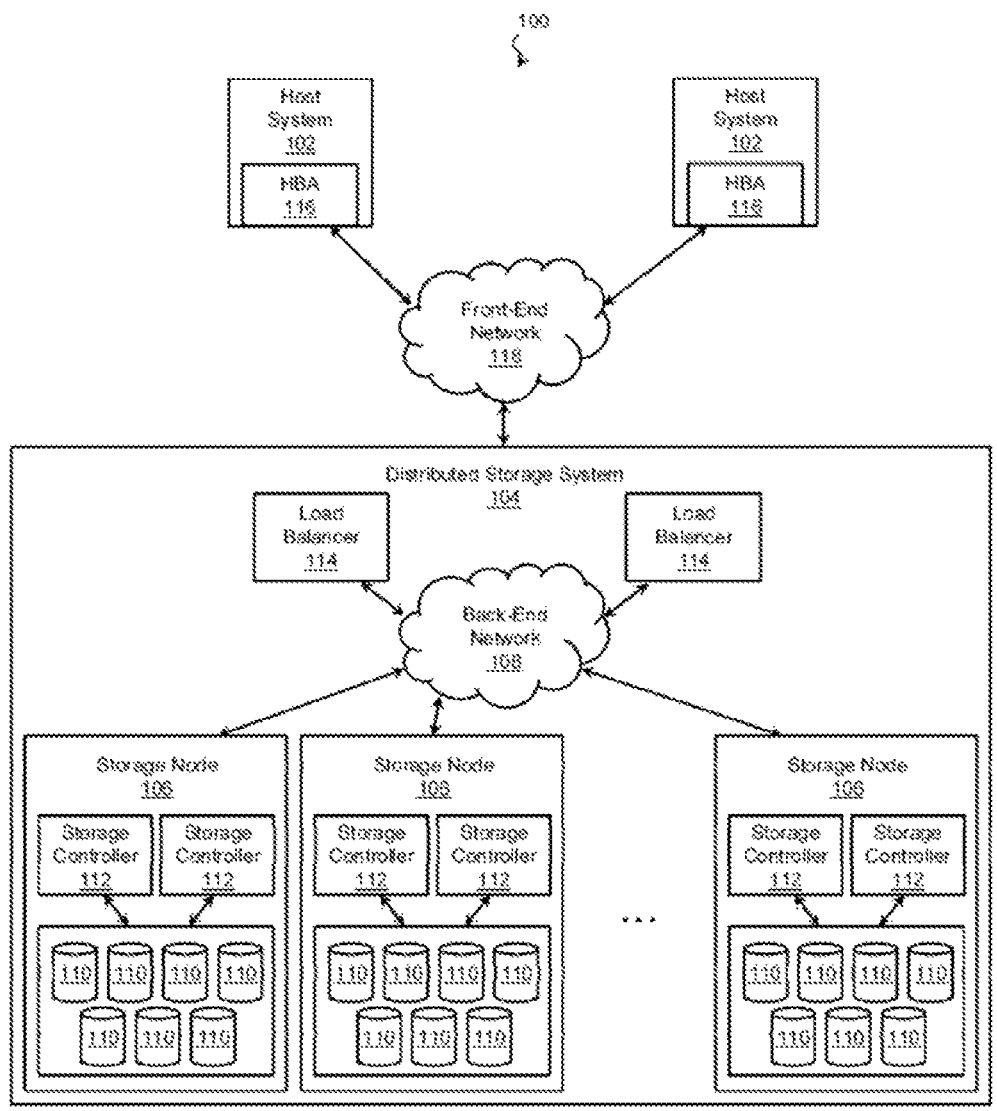
FIG. 1 is a schematic diagram of a computing architecture according to one or more aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, particular features described in relation to one aspect or embodiment may be applied to other disclosed aspects or embodiments of the disclosure, even though not specifically shown in the drawings or described in the text.

Some cloud providers provide a plurality of storage tiers, with each storage tier being associated with a different cost. A client may store content at a cloud endpoint including a plurality of storage tiers. A "storage tier" may also be referred to as a "tier." Additionally, the term "content" may be used to refer to a "data object" or an "object." In some examples, the plurality of tiers includes an accessible tier and an archive tier. Data objects that are stored on the accessible tier are accessible by the client, and data objects that are stored on the archive tier are inaccessible by the client. If a client desires to access a data object that is stored on the archive tier, the client transmits a restore request that causes the cloud endpoint to move the data object from the archive tier to the accessible tier, at which point the data object is then accessible by the client. Although restore operations may be very time consuming (e.g., ten hours), some clients may opt for the archive tier for content that is infrequently accessed and/or has flexible retrieval latency requirements.

After a restore operation is completed, the data object may be stored on the accessible tier. While the data object is stored on the accessible tier, the client may be charged a more expensive fee than if the data object were stored on the archive tier. Some cloud providers do not provide an automatic mechanism for data objects to return to the archive tier after the data objects have been restored. It may be desirable to provide a way to transition these data objects back to the archive tier to preserve the cost efficiency of using an archival storage cloud. For example, it may be desirable to keep the data object in an accessible state for a specified duration and guarantee that the object will return to archival storage at some point after the duration passes, regardless of the given cloud provider.

The present application provides techniques for minimizing costs by minimizing the time data objects remain in a more expensive tier when the restore period is over. Any distributed storage mechanism having multiple storage tiers with differing associated costs may benefit from the techniques provided in the present disclosure. Additionally or alternatively, the techniques provided in the present disclosure may be applicable to client-driven restore requests as well as background grid work, such as moving objects back onto the grid, or repairing objects using a cloud copy.

Accordingly, the present application provides techniques to automatically track restore periods and return corresponding data objects to less expensive tier(s), which also reduces the amount of traffic required from clients in the form of commands, requests, and the like.

FIG. 1 is a schematic diagram of a computing architecture 100 according to one or more aspects of the present disclosure. The computing architecture 100 includes one or more host systems 102 (hosts), each of which may interface with a distributed storage system 104 to store and manipulate data. The distributed storage system 104 may use any suitable architecture and protocol. For example, in some embodiments, the distributed storage system 104 is a StorageGRID® system, an OpenStack® Swift system, a Ceph system, or other suitable system. The distributed storage system 104 includes one or more storage nodes 106 over which the data is distributed. The storage nodes 106 are coupled via a back-end network 108, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some embodiments, the storage nodes 106 are coupled by a transmission control protocol/Internet protocol (TCP/IP) back-end network 108, which may be local to a rack or datacenter, although additionally or in the alternative, the network 108 may extend between sites in a WAN configuration or be a virtual network extending throughout a cloud. As can be seen, the storage nodes 106 may be as physically close or as widely dispersed as the application may warrant. In some examples, the storage nodes 106 are housed in the same racks. In other examples, storage nodes 106 are located in different facilities at different sites anywhere in the world. The node arrangement may be determined based on cost, fault tolerance, network infrastructure, geography of the hosts, and/or other considerations. A technique for preserving and restoring the data contained in these storage nodes 106, suitable for use with any of these arrangements, is described with reference to the figures that follow.

Figure 2:
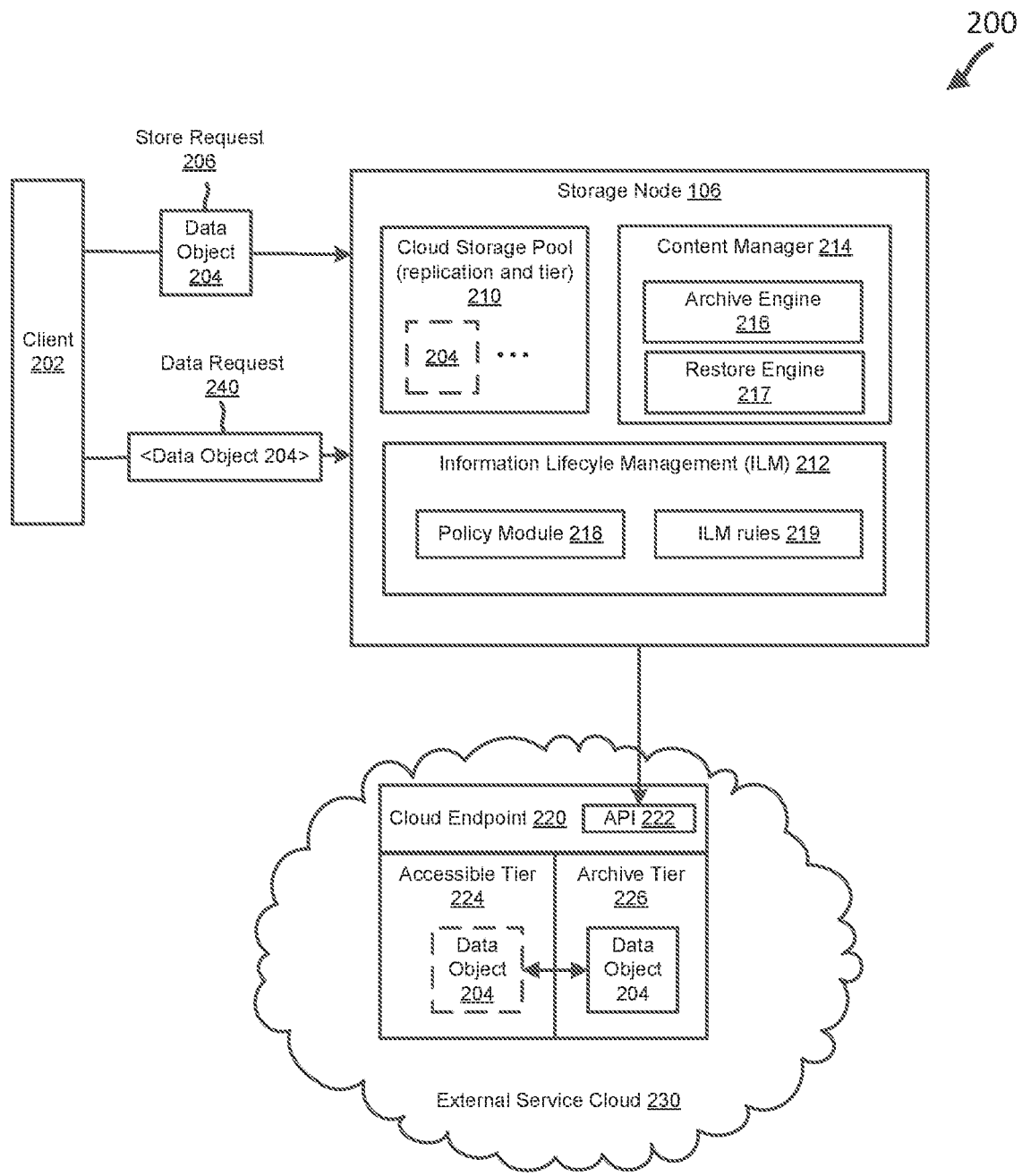
FIG. 2 is a schematic diagram of a client storing a data object via a storage node according to one or more aspects of the present disclosure.
Figure 3:
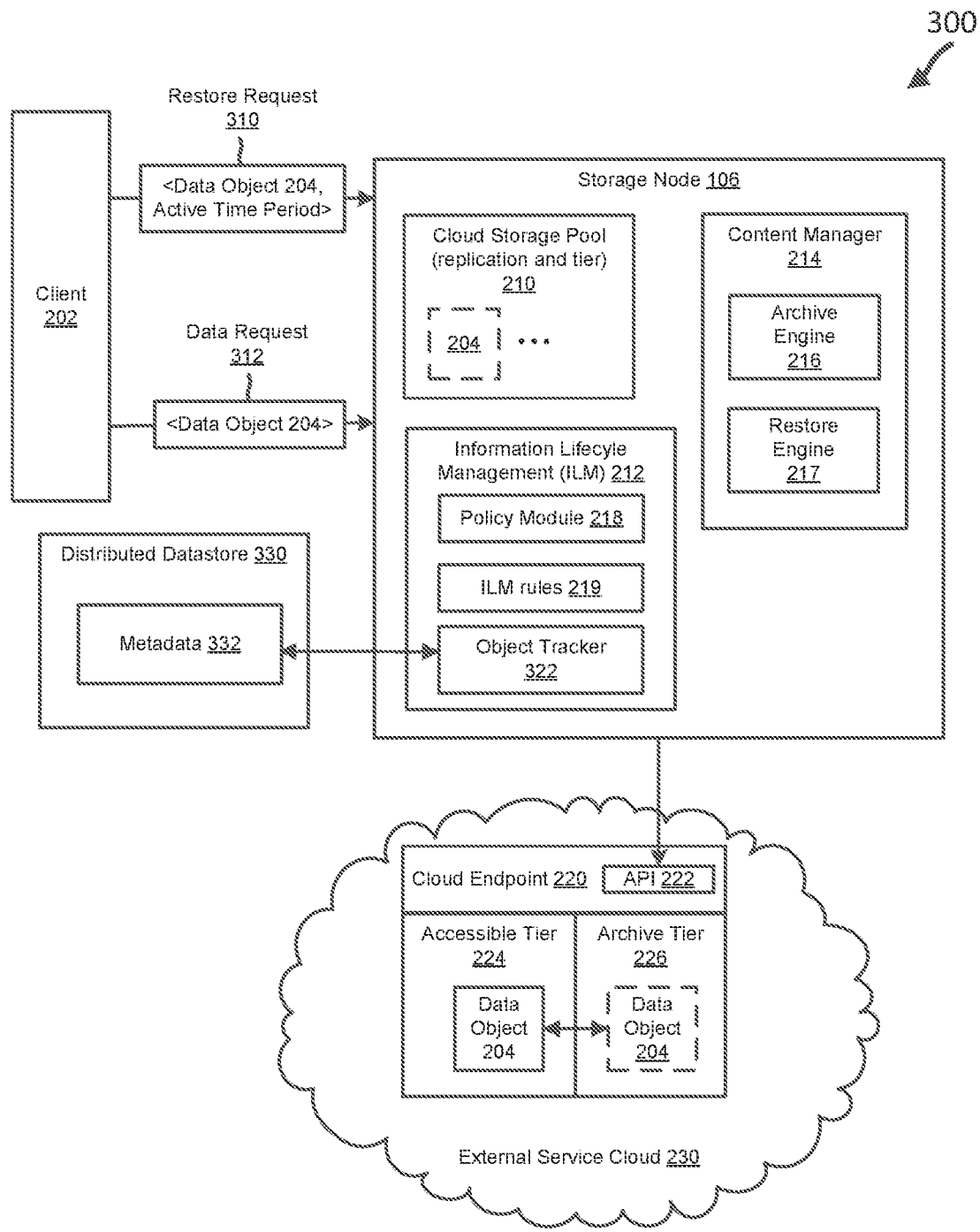
FIG. 3 is a schematic diagram of a client restoring a data object for a specified active time period according to one or more aspects of the present disclosure.

In the illustrated embodiment, the computing architecture 100 includes a plurality of storage nodes 106 in communication with a plurality of hosts 102. It is understood that for clarity and ease of explanation, only a limited number of storage nodes 106 and hosts 102 are illustrated, although the computing architecture 100 may include any number of hosts 102 in communication with a distributed storage system 104 containing any number of storage nodes 106. An example storage system 104 receives data transactions (e.g., requests to read and/or write data) from the hosts 102 and takes an action such as reading, writing, or otherwise accessing the requested data so that the storage devices 110 of the storage nodes 106 appear to be directly connected (local) to the hosts 102. This allows an application running on a host 102 to issue transactions directed to the data of the distributed storage system 104 and thereby access this data as easily as it can access data on storage devices local to the host 102. In that regard, the storage devices 110 of the distributed storage system 104 and the hosts 102 may include hard disk drives (HDDs), solid state drives (SSDs), storage class memory (SCM), RAM drives, optical drives, and/or any other suitable volatile or non-volatile data storage medium. Further, one or more of the storage nodes 106 may be connected to one or more cloud storage providers according to embodiments of the present disclosure (e.g., as illustrated in FIGS. 2 and 3 and discussed further below), and likewise appear to be directly connected (local) to the hosts 102.

With respect to the storage nodes 106, an exemplary storage node 106 contains any number of storage devices 110 in communication with one or more storage controllers 112. The storage controllers 112 exercise low-level control over the storage devices 110 in order to execute (perform) data transactions on behalf of the hosts 102, and in so doing, may group the storage devices for speed and/or redundancy using a protocol such as RAID (Redundant Array of Independent/Inexpensive Disks). The grouping protocol may also provide virtualization of the grouped storage devices 110. At a high level, virtualization includes mapping physical addresses of the storage devices into a virtual address space and presenting the virtual address space to the hosts 102, other storage nodes 106, and other requestors. In this way, the storage node 106 represents the group of storage devices as a single device, often referred to as a volume. Thus, a requestor can access data within a volume without concern for how it is distributed among the underlying storage devices 110.

Further, an example storage node 106 may be connected to one or more cloud storage providers of varying levels (e.g., standard cloud storage or lower-class cloud storage, or both, for example, S3® or GLACIER® storage classes). The storage node 106 connected to one or more cloud storage providers may exercise protocol-level control over the allocated cloud storage space available to it on behalf of the hosts 102. Such control may be via one or more protocols such as HyperText Transfer Protocol (HTTP), HyperText Transfer Protocol Secure (HTTPS), etc.

In addition to storage nodes, the distributed storage system 104 may include ancillary systems or devices (e.g., load balancers 114). For example, in some embodiments, a host 102 may initiate a data transaction by providing the transaction to a load balancer 114. The load balancer 114 selects one or more storage nodes 106 to service the transaction. When more than one alternative is possible, the load balancer 114 may select a particular storage node 106 based on any suitable criteria including storage node load, storage node capacity, storage node health, network quality of service factors, and/or other suitable criteria. Upon selecting the storage node(s) 106 to service the transaction, the load balancer 114 may respond to the host 102 with a list of the storage nodes 106 or may forward the data transaction to the storage nodes 106. Additionally, or in the alternative, a host 102 may initiate a data transaction by contacting one or more of the storage nodes 106 directly rather than contacting the load balancer 114.

Turning now to the hosts 102, a host 102 includes any computing resource that is operable to exchange data with the distributed storage system 104 by providing (initiating) data transactions to the distributed storage system 104. In an example embodiment, a host 102 includes a host bus adapter (HBA) 116 in communication with the distributed storage system 104. The HBA 116 provides an interface for communicating, and in that regard, may conform to any suitable hardware and/or software protocol. In various embodiments, the HBAs 116 include serial attached small computer system interface (SCSI), iSCSI, InfiniBand, Fibre Channel, and/or Fibre Channel over Ethernet (FCoE) bus adapters. Other suitable protocols include serial advanced technology attachment (SATA), eSATA, parallel advanced technology attachment (PATA), universal serial bus (USB), and FireWire, or the like. In some example, the host HBAs 116 are coupled to the distributed storage system 104 via a front-end network 118, which may include any number of wired and/or wireless networks such as a LAN, an Ethernet subnet, a PCI or PCIe subnet, a switched PCIe subnet, a WAN, a MAN, the Internet, or the like. To interact with (e.g., read, write, modify, etc.) remote data, the HBA 116 of a host 102 sends one or more data transactions to the load balancer 114 or to a storage node 106 via the front-end network 118. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

While the load balancers 114, storage nodes 106, and the hosts 102 are referred to as singular entities, a storage node 106 or host 102 may include any number of computing devices and may range from a single computing system to a system cluster of any size. Accordingly, each load balancer 114, storage node 106, and host 102 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic HDDs, SSD, or an optical memory (e.g., compact disk read-only memory (CD-ROM), digital versatile disk (DVD), Blu-ray disk (BD)); a video controller such as a graphics processing unit (GPU); a communication interface such as an Ethernet interface, a Wi-Fi (IEEE 802.11 or other suitable standard) interface, or any other suitable wired or wireless communication interface; and/or a user input/output (I/O) interface coupled to one or more user I/O devices such as a keyboard, mouse, pointing device, or touchscreen.

As described above, the storage system 104 may distribute the hosts' data across the storage nodes 106 for performance reasons as well as redundancy. The distributed storage system 104 may be an object-based data system. The storage system 104 may be a distributed object store that spans multiple storage nodes 106 and sites. In brief, object-based data systems provide a level of abstraction that allows data of any arbitrary size to be specified by an object identifier. Object-level protocols are similar to file-level protocols in that data is specified via an object identifier that is eventually translated by a computing system into a storage device address. However, objects are more flexible groupings of data and may specify a cluster of data within a file or spread across multiple files. Object-level protocols include cloud data management interface (CDMI), HTTP, SWIFT, and S3. A data object represents any arbitrary unit of data regardless of whether it is organized as an object, a file, or a set of blocks.

A client may store content, for example, on the storage node 106 or an external service cloud. The term "content" may be used to refer to as a "data object" or an "object." The storage node 106 may provide the client with a quicker response time for the content than if the content were stored on the external service cloud. It may be desirable for the client to store content that is frequently accessed and/or content that the client desires to be highly available on the storage node 106.

Some data objects stored at the storage node 106 may be infrequently accessed and/or have flexible retrieval latency requirements. Long-term storage for data objects that are infrequently accessed and/or have flexible retrieval latency requirements can waste space stored on the storage node 106 that would otherwise be used for data objects that are more frequently accessed and/or content that the client desires to be highly available. To lower storage costs, the client may move these data objects from the storage node 106 to an external service cloud. The cost to a client of storing content on the external service cloud may be an order of magnitude cheaper than storing content on the storage node 106. In some examples, an administrator may configure a cloud endpoint including a plurality of tiers, each tier associated with differing costs (e.g., storage cost, access cost, etc.) and/or performance characteristic(s) relative to each other.

The plurality of tiers may include an accessible tier and an archive tier. Data objects that are stored on the accessible tier are accessible by the client, and data objects that are stored on the archive tier are inaccessible by the client. If the client desires to access a data object stored on the archive tier, the client may transmit to the cloud endpoint a restore request that causes the data object to be moved from the archive tier to the accessible tier. Although a restore of a data object may be time consuming, a client may prefer to store the data object on the archive tier because doing so may be cheaper (e.g., an order of magnitude) than storing the data object on the accessible tier.

After a data object is restored, the data object is stored on the accessible tier. It may be desirable to transition the data object from the accessible tier back to the archive tier to reduce costs. Some cloud providers do not support auto-tiering data natively. For example, if a data object has been restored to the accessible tier, some cloud providers may be unable to automatically move the data object back to the archive tier. For example, a cloud provider may be unable to track the data objects that have been restored and request information from the client regarding how long the client would like the data object to remain on the accessible tier, and thus also be unable to automatically re-tier the data object back to the archive tier.

It may be desirable to perform a restore operation on a data object for a client and allow the client to specify an active time period indicating for how long the client would like the data object to remain stored on the accessible tier. The present application provides techniques for tracking data objects stored on cloud endpoints and moving data objects from the accessible tier back to the archive tier when data objects have satisfied their specified active time periods. A data object has satisfied its active time period if the data object has remained stored on the accessible tier for at least the active time period specified by the client in the restore request. Accordingly, a restored data object may be transitioned back to a less accessible, less expensive tier, regardless of the cloud storage provider. The present disclosure may be beneficial to cloud providers that do not offer an automatic move back into their cheaper storage (e.g., archive tier) after content has been restored to the accessible tier.

FIG. 2 is a schematic diagram 200 of a client storing a data object via the storage node 106 according to one or more aspects of the present disclosure. In the example illustrated in FIG. 2, a client 202 may transmit a data object 204 and a store request 206 to the storage node 106. The store request 206 may be a request to store the data object 204. The storage node 106 receives the data object 204 and the store request 206 from the client 202.

The storage node 106 in FIG. 2 corresponds to storage node 106 in FIG. 1. The storage node 106 may coordinate and manage resources from multiple clouds (e.g., a public and a private cloud) within a single grid or other storage grids and provide access to tiered data objects to one or more clients 202. Many storage nodes 106 may be present in the grid and store data objects in the grid. Accordingly, if parts of the grid become unavailable (e.g., a storage node goes down), the client 202 may still be able to access objects tiered to the cloud by leveraging resources on the multiple storage nodes 106 that are still available. For example, each storage node 106 may receive metadata for the objects tiered to one or more clouds. Thus, while a given storage node 106 may have initially tiered particular data to a cloud storage provider, the corresponding metadata becomes available in the other storage nodes 106 in the grid and therefore those other storage nodes 106 now have the appropriate information to access that tiered data independent of the originating storage node 106.

The storage node 106 includes a cloud storage pool 210, an information lifecycle management (ILM) 212, and a content manager 214. A data object may be stored in the grid and then archived to another location (e.g., on an external service cloud). The cloud storage pool 210 may be used to store data objects on a cloud storage service. For example, the cloud storage pool 210 may act as a temporary storage location for data objects before they are tiered to the cloud (e.g., external service cloud 230 in FIG. 2). The ILM 212 includes a policy module 218 that manages a set of prioritized ILM rules 219 that specify the instructions for managing object data over time. A rule may also be referred to as a policy in the present disclosure. The content stored by the storage node 106 may be subject to the ILM rules 219. An administrator may configure the ILM rules 219 in accordance with an enterprise organization's business practices and goals. For example, the administrator may take advantage of lower costs associated with storing the data object 204 at a cloud endpoint 220 compared to at the storage node 106 (e.g., storage devices 110). Storage at the cloud endpoint 220 may be an order of magnitude cheaper than storage at the storage node 106. The cloud endpoint 220 may include a server and may also be referred to as a server in the present disclosure.

An administrator (e.g., grid administrator) may use the policy module 218 to configure an ILM rule that specifies a location (e.g., the cloud endpoint 220) in the external service cloud 230 for storage of data objects. The administrator may configure the cloud storage pool 210 for archival use to significantly reduce the costs of storing data objects and may also configure the cloud endpoint 220. The cloud endpoint 220 exposes an application programming interface (API) 222 that the storage node 106 may invoke to access a data object stored at the cloud endpoint 220. For example, the storage node 106 may invoke one or more APIs 222 to, for example, send data objects to the cloud endpoint 220 for storage, request access (e.g., read access) to the data objects stored at the cloud endpoint 220, modify the data objects stored at the cloud endpoint 220, and/or move data objects from one tier to another tier at the cloud endpoint 220.

The external service cloud 230 may include, for example, Amazon Web Services (AWS)® S3®, AWS Glacier®, a Microsoft® Azure® cloud, etc. The cloud storage pool 210 may be a cloud storage location from any cloud provider (e.g., a bucket on AWS® S3®, a container on Azure® Blob Storage, etc.) supported by the storage node 106 for moving data objects off premises and tracked as a cloud location type. For example, the cloud storage pool 210 may be the configuration information that the storage node 106 stores to access a bucket or container in AWS® 53® or Microsoft® Azure®. The cloud endpoint 222 may be, for example, an Azure® server. It should be understood that these are non-limiting examples.

Components of the storage node 106 (e.g., ILM 212 and cloud storage pool 210) may use the content manager 214 to communicate with the external service cloud 230. The content manager 214 may track the lifecycle of content stored at the storage node 106 using the ILM rules 219. For example, the content manager 214 may move the data object 204 stored at the storage node 106 out to the cloud endpoint 220 in accordance with the ILM rules 219. In an example, some content stored on the storage node 106 may be accessed infrequently. The client 202 may desire to move content that is accessed infrequently to the cloud endpoint 220 versus keeping the content stored on the storage node 106. The cloud endpoint 220 may be a long-term storage, and storage of data objects on the cloud endpoint 220 may be less expensive than storage of data objects on the storage node 106. Components included in the storage node 106 (e.g., cloud storage pool 210 and ILM 212) may use the content manager 214 to communicate with the cloud endpoint 220. In response to receiving the store request 206, the content manager 214 may invoke the API 222 exposed by the cloud endpoint 220 to request storage of the data object at the cloud endpoint 220. The cloud endpoint 220 may receive (e.g., via the API 222) the data object 204 for storage at the cloud endpoint 220 and may accordingly store the data object 204 on a default tier.

The cloud endpoint 222 includes a plurality of tiers including an accessible tier 224 and an archive tier 226. Data objects stored on the accessible tier 224 are accessible by clients, and data objects stored on the archive tier 226 are not immediately accessible by clients. If a data object is tiered to the accessible tier 224 and then transitioned to the archive tier 226, the data object may not be directly accessible from the grid. For example, if the client 202 attempts to retrieve the data object stored on the archive tier 226, the content manager 214 may determine that the data object is not immediately accessible by the client and may accordingly transmit to the client 202 an error specifying that the data object is in an invalid state. The client 202 may receive the error message and transmit a restore request to restore the data object. The cloud endpoint 220 may receive the restore request and transmit it to the cloud endpoint 220, which initiates restoration of the data object. The client 202 may be expected to periodically check for the completion of the restore operation. Depending on the resource tier being used, the completion time may vary greatly (e.g., from a couple of minutes to 12 hours or more). Accordingly, for a data object stored on the archive tier 226 to be accessed by a client 202, the data object is moved from the archive tier 226 to the accessible tier 224, at which point the data object may then be accessible by the client 202.

The accessible tier 224 offers a different service level agreement (SLA) from the archive tier 226. For example, as discussed above, if the client 202 desires access (e.g., read or write access) to a data object stored on the archive tier 226, it may take a longer time for the client 202 to be able to access the data object compared to if the data object were stored on the accessible tier 224. The archive tier 226 may provide long-term storage for data objects that are, for example, infrequently accessed and/or have flexible retrieval latency requirements. A client may desire to store content on the archive tier 226 over the accessible tier 224 because content storage on the archive tier 226 may be less expensive than content storage on the accessible tier 224. For example, the cost of storing content on the archive tier 226 may be an order of magnitude cheaper than storing content on the accessible tier 224. Although the cloud endpoint 220 is shown as having two tiers, this is not intended to be limiting, and the cloud endpoint 220 may have two or more tiers.

Additionally, the accessible tier 224 may itself have a plurality of tiers (not shown). For example, an administrator may configure the accessible tier 224 with a "hot" tier and a "cool" tier, and the hot/cool tiers may be configured directly on a container (e.g., Azure® container), where storage of and/or access to data objects stored on the hot tier is more expensive for the client 202 than storage of and/or access to data objects stored on the "cool" tier. A container provides a platform to separate an application from the infrastructure running the application. The platform may provide a mechanism to run an application securely isolated in the container. A container is a self-contained execution environment and may share the kernel of the host operating system with other containers.

Returning to the storage node 106 in FIG. 2, the content manager 214 includes an archive engine 216 and a restore engine 217. The restore engine 217 may move content from the archive tier 226 to the accessible tier 224 by transmitting a request to the cloud endpoint 220 to perform the move. The archive engine 216 may move content from the accessible tier 224 to the archive tier 226 by transmitting a request to the cloud endpoint 220 to perform the move. The archive engine 216 may, for example, invoke the API 222 to transmit the request. An ILM rule 219 may specify that if a data object has not been accessed for a threshold amount of time, the data object should be moved from the accessible tier 224 to the archive tier 226. If the archive engine 216 detects, based on the ILM rule 219, that the infrequently accessed data object 204 should be moved from the accessible tier 224 to the archive tier 226, the archive engine 216 transmits a request for moving the data object 204 from the accessible tier 224 to the archive tier 226 to the cloud endpoint 220. The cloud endpoint 220 receives the request from the archive engine 216 and accordingly may move the data object 204 from the accessible tier 224 to the archive tier 226. As indicated by the dashed lines around the data object 204 on the accessible tier 224 and the solid lines around the data object 204 on the archive tier 226 in FIG. 2, the cloud endpoint 220 has moved the data object 204 from the accessible tier 224 to the archive tier 226.

The client 202 may transmit a data request 240 for the data object 204 to the storage node 106. The content manager 214 may receive the data request 240 and determine that the data object 204 is stored at the cloud endpoint 220. Accordingly, the content manager 213 may transmit a request to the cloud endpoint 220 for the data object 204. If the data object 204 is stored on the accessible tier 224, the data object 204 is accessible by the client 202. Conversely, if the data object 204 is stored on the archive tier 226, the data object 204 is inaccessible by the client 202. In this example, for the data object 204 to be accessible by the client, the cloud endpoint 220 would move the data object 204 from the archive tier 226 to the accessible tier 224, at which point the data object 204 would then be accessible by the client 202. The cloud endpoint 220 may receive the data request from the content manager 214 and search for the data object 204.

In some aspects, the cloud endpoint 220 searches the accessible tier 224 and, if necessary, archive tier 226 for the data object 204. If the cloud endpoint 220 finds the data object 204 on the accessible tier 224, the cloud endpoint 220 returns the data object 204 to the content manager 214, which in turn transmits the data object 204 to the client 202. If the cloud endpoint 220 finds the data object 204 on the archive tier 226, the cloud endpoint 220 transmits a message indicating that the data object 204 is stored on the archive tier 226 to the content manager 214.

In some aspects, the cloud endpoint 220 keeps track of data objects stored at the cloud endpoint 220. If the cloud endpoint 220 receives a request for a data object and the cloud endpoint 220 determines that the data object is stored at the cloud endpoint 220, the cloud endpoint 220 may search the accessible tier 224 for the data object. If the cloud endpoint 220 does not find the data object stored on the accessible tier 224, the cloud endpoint 220 may determine that the data object is stored on the archive tier 226 and may return a message indicating that the data object 204 is stored on the archive tier 226 to the content manager 214.

In response to receiving the message indicating that the data object 204 is stored on the archive tier 226, the content manager 214 may transmit such message to the client 202. The client 202 may receive the message and in response, determine that the data object 204 should be restored to the accessible tier 224 for the data object to be accessible by the client 202. The client 202 may transmit a restore request to the storage node 106. When a data object is restored, as will be discussed in further detail below, the data object may remain stored on the cloud, in the accessible tier 224 until it is moved back to the archive tier 226.

FIG. 3 is a schematic diagram 300 of a client restoring a data object for a specified active time period according to one or more aspects of the present disclosure. In the example illustrated in FIG. 3, a client 202 may transmit to the storage node 106, a restore request 310 to restore the data object 204. The restore request 310 may specify an identifier of the data object 204 and an active time period for which the client 202 desires the data object 204 to remain available (e.g., stored on the accessible tier 224). Accordingly, the client 202 may specify a time period during which the client 202 agrees to pay higher charges for the data object 204 to remain accessible by the client 202. The storage node 106 receives the restore request 310 from the client 202.

In response to receiving the restore request 310, the restore engine 217 may transmit a request to the cloud endpoint 220 to restore the data object 204 to the accessible tier 224. For example, the restore engine 217 may invoke the API 222 to transmit the request. The cloud endpoint 220 may receive the restore request 310 from the restore engine 217 and start the restore process, which may take a long duration of time (e.g., fifteen hours). After the cloud endpoint 220 has initiated the restore process, the cloud endpoint 220 may transmit a message notifying the storage node 106 that the restore process has been initiated. The restore engine 217 may receive the message from the cloud endpoint 220 and transmit a message indicating that the restore process for the data object 204 has been initiated to the client 202. The client 202 may receive the message. In some examples, a HEAD operation may be used to retrieve metadata from the data object without returning the data object itself. The client 202 may execute the HEAD operation to check the data object's state to determine whether the data object restore has completed and whether the data object is in a retrievable state. The client 202 may transmit a data request 312 for the data object 204 to the storage node 106.

The storage node 106 may receive the data request 312 from the client 202 and transmit it to the cloud endpoint 220. If the data object 204 has not been fully restored to the accessible tier 224 yet, the cloud endpoint 220 may transmit a message indicating such to the storage node 106. The storage node 106 may receive the message indicating that the cloud endpoint 220 has not completed the restore of the data object 204 to an accessible tier and may transmit this message to the client 202. The client 202 may then wait for a period of time before submitting another data request for the data object 204 to the storage node 106. If the data object 204 has been fully restored to the accessible tier 224, the data object 204 is accordingly accessible by the client 202. If the data object is stored on the accessible tier 224, the cloud endpoint 220 may return the data object 204 to the storage node 106, which may then transmit the data object 204 to the client 202.

While the data object 204 is stored on the accessible tier 224, the cloud endpoint 220 may charge the client 202 a premium for such storage. In an example, the client 202 may have restored the data object 204 to the accessible tier 224 with the intention of accessing the data object frequently for the next ten days. For example, the data object 204 may include old tax information, and the organization associated with the client 202 may have arranged for auditors to access the old tax information for the next ten days. After the ten days, the organization may expect the data object 204 to be rarely accessed. Accordingly, the client 202 may desire for the data object 204 to remain stored on the accessible tier 224 for a duration of ten days. Any extra time that the data object 204 remains stored on the accessible tier 224 after the specified active time period may cost the organization more than what it was originally willing to pay.

In some aspects, the cloud endpoint 220 does not have the functionality to automatically move data objects from the accessible tier 224 back to the archive tier 226 and/or the functionality to move data objects from the accessible tier 224 back to the archive tier 226 in accordance with the active time period specified in the restore request 310 by the client 202. At a later point, when the organization views the bill for its content storage, the organization may be unhappy with the costs associated with storing content at the cloud endpoint 220. Such discontent may cause the client to have an unhappy experience and move its storage needs to another cloud provider.

The present disclosure provides techniques for data objects to be returned to the archive tier 226 after having been restored to the accessible tier 224, while being consistent with client goals and driving down client costs. The storage node 106 may keep track of the active time period specified for the data object 204 in the restore request 310 on behalf of the cloud endpoint 220. The storage node 106 may optimize the costs for storing data objects at the cloud endpoint 220 in accordance with a client's specified active time period.

In the example illustrated in FIG. 3, the ILM 212 includes an object tracker 322, and the storage node 106 is coupled to a distributed datastore 330. In some examples, the distributed datastore 330 is Cassandra® provided by Apache® (as a non-limiting example). In some aspects, the object tracker 322 may insert metadata associated with restore requests into the distributed datastore 330. For example, in response to receiving the restore request 310, the object tracker 322 may insert metadata of a data object into the distributed datastore 330, where the metadata includes information such as the identifier of the data object, the active time period associated with the data object, a location type of the data object (e.g., cloud storage pool 210, cloud endpoint 220, etc.), and/or one or more timestamps (e.g., e.g., start time of the restore (e.g., "restore_start" timestamp), expiry of the restore (e.g., "restore_expiry" timestamp), and/or a transition time back to the archive tier 226 (e.g., "retier_time" timestamp)) associated with the restored data object. The metadata may be stored on the distributed datastore 220 remote from the storage node 106. The object tracker 322 may iterate through all data objects stored on the grid using the metadata 332 and determine, based on the metadata 332, whether each iterated data object should be re-tiered. For example, the object tracker 322 may track data objects and their associated active time periods specified by clients to move the data objects back to the archive tier 226 as soon as possible after their associated active time periods have elapsed. Accordingly, the object tracker 322 ensures that data objects remain stored on the accessible tier 224 for at least as long as the specified active time period, but then return to the archive tier 226.

In some aspects, the object tracker 322 stores three timestamps in the metadata associated with data objects. When the restore engine 217 initiates a restore of a data object, the restore engine 217 may set and store a restore_start timestamp indicating a start time of the restore in the metadata. The cloud endpoint 220 may receive the restore request from the restore engine 217 and return an indication that the restore has been accepted by the cloud endpoint 220. In response to receiving the indication that the restore has been accepted by the cloud endpoint 220, the restore engine 217 may set a restore_expiry timestamp indicating an expiry time of the restore. The expiry time of the restore may correspond to the active time period discussed in the present disclosure. An advantage of having both the restore_start timestamp and the restore_expiry timestamp may provide certainty that the data object has been restored at the cloud endpoint 220. The restore engine 217 may return the restore_ start timestamp and the restore_expiry timestamp as a header for certain client operations, complying with protocols between the client 202 and the storage node 106. Additionally or alternatively, an advantage of keeping track of both the restore_start timestamp and the restore_expiry timestamp may provide for the data object to be re-tiered in the case of failure to write to the restore_expiry timestamp. Accordingly, no data objects would remain in an accessible and more expensive tier indefinitely.

The object tracker 322 may iterate through all data objects stored on the grid and determine whether each iterated data object should be re-tiered. For example, the object tracker 322 may compare the minimum restore duration (e.g., restore_start timestamp+1 day) and the expected expiry time (restore_expiry timestamp) by finding a maximum between these two times. If the maximum timestamp is in the future (the active time period has not yet elapsed), the object tracker 322 may check the data object again during the next scan to determine whether it should be re-tiered. If the maximum timestamp has passed and the retier_time timestamp is either even earlier or non-existent, then the archive engine 216 may transmit a request (e.g., via the API 222 exposed by the cloud endpoint 220) to transition the data object back into the archive tier 226. If the data object is successfully moved back to the archive tier 226, the retier_ time is updated to avoid another re-tier in the next scan.

In some aspects, the object tracker 322 scans the metadata specifying a location type of the data object 204, a restore start timestamp indicating a start time of a restore of the data object 204, and a restore expiry timestamp indicating the active time period specified for the data object 204. The object tracker 322 may determine a re-tier timestamp based on the restore start timestamp and the restore expiry timestamp and may compare the re-tier timestamp to a current timestamp to determine whether the active time period has elapsed. For example, if the restore start timestamp includes Jan. 1, 2020 at 3:50 PM and the restore expiry timestamp specifies 10 days, then the re-tier timestamp is Jan. 11, 2020 at 3:50 PM. Accordingly, the data object satisfies the active time period when the current timestamp is or has passed the re-tier timestamp, Jan. 11, 2020, 3:50 PM (e.g., Jan. 11, 2020 at 3:51 PM, Jan. 16, 2020, etc.). If the current timestamp has passed the re-tier timestamp (the re-tier timestamp is in the past), the data object has satisfied the active time period and may accordingly be re-tiered. If, however, the current timestamp has not yet passed the re-tier timestamp (the re-tier timestamp is in the future), the data object has not satisfied the active time period and the data object remains stored on the accessible tier 224. The object tracker 322 may proceed to iterate the next piece of metadata associated with another data object and may scan the metadata associated with the data object 204 again at a later point in time.

Accordingly, the object tracker 322 may keep track of how long data objects have been active for (e.g., stored on the accessible tier 224) and may scan the metadata 332 to assist in moving data objects from the accessible tier 224 back to the archive tier 226 when data objects have satisfied their specified active time periods. A data object has satisfied its active time period if the data object has remained stored on the accessible tier 224 for at least the active time period specified by the client 202 in the restore request. Additionally, the object tracker 322 may maintain expected object availability in the cloud by scanning through objects on the grid via the metadata 332.

The object tracker 322 may scan the metadata 332 stored in the distributed datastore 330. If the timestamp indicates that the data object has not satisfied its active time period, the object tracker 322 may scan the next item in the metadata 332. If the location type specified in the metadata 332 for a data object indicates that a data object has been restored to the accessible tier 224 and the timestamp indicates that the data object has satisfied its active time period, the object tracker 322 may communicate with the archive engine 216 to move the data object 204 back to the archive tier 226. In response to detecting that the data object 204 has satisfied the active time period, the archive engine 216 may transmit a request to the cloud endpoint 220 to move the data object 204 to the archive tier 226. In an example, the archive engine 216 may invoke the API 222 exposed by the cloud endpoint 220 to transition the data object 204 from the accessible tier 224 to the archive tier 226. The cloud endpoint 220 may receive the request to move the data object 204 to the archive tier 226 and accordingly may move the data object 204 to the archive tier 226.

If the client 202 desires to access the data object 204 that is stored on the archive tier 226, the data object 204 may be restored again to the accessible tier 224 as discussed in the present disclosure so that the data object is again accessible by the client 202.

An advantage of the present disclosure may provide failure tolerance. For example, the storage node 106 (e.g., restore engine 217, the archive engine 216, object tracker 322, etc.) may be able to handle failures from nodes and components because another node may pick up objects to scan if another node is down. For example, if the archive engine 216 included in the storage node 106 to transition a data object back to the archive tier 226 is down, another archive engine on another storage node may be able to perform this action and transition the data object back to the archive tier 226. Another advantage of these features may provide a mechanism that is tolerant to failures occurring during the transition of data objects. For example, if the transition fails, the object tracker 322 may retry the operation at the next scan, which allows the mechanism to be tolerant to other factors causing transition failure.

Figure 4:
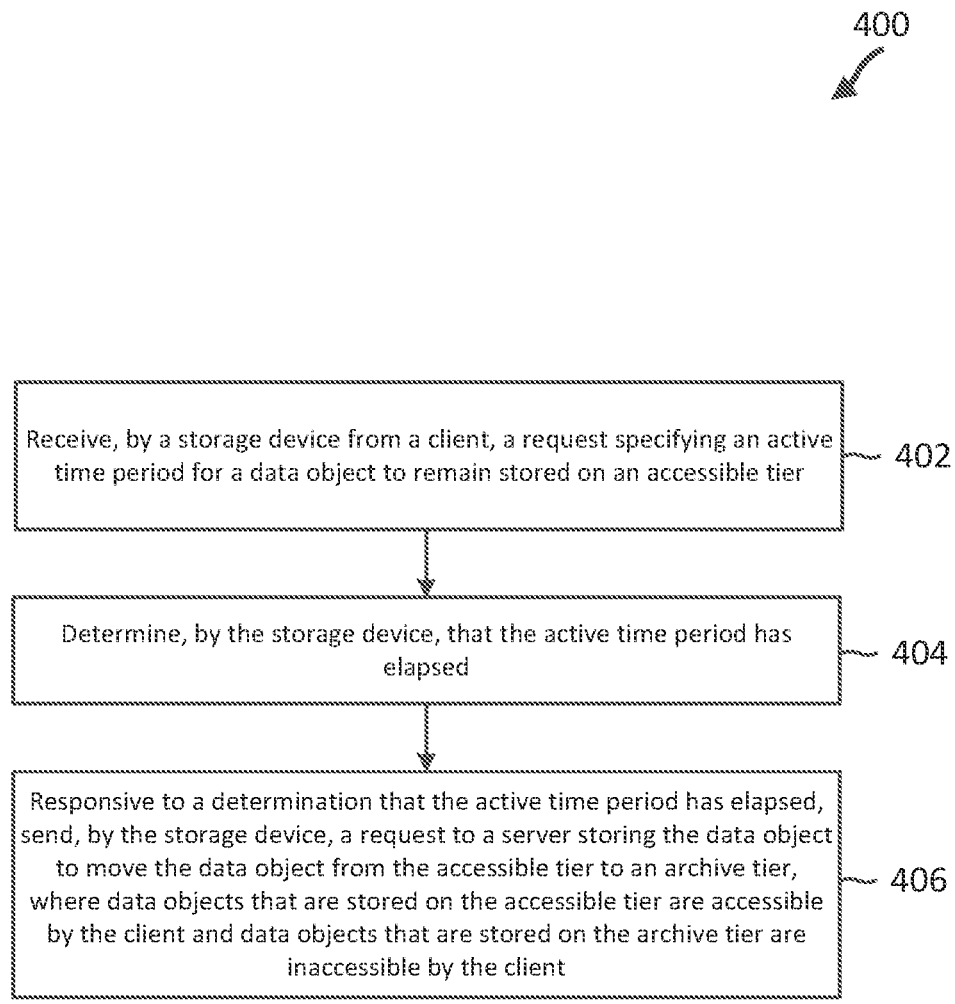
FIG. 4 is a flow diagram of a method of transitioning a data object from an accessible tier to an archive tier according to one or more aspects of the present disclosure.

FIG. 4 is a flow diagram of a method 400 of transitioning a data object from the accessible tier to the archive tier after a specified active time period has elapsed according to one or more aspects of the present disclosure. Blocks of the method 400 can be executed by a computing device (e.g., a processor, processing circuit, and/or other suitable component). For example, a storage node such as the storage node 106, may utilize one or more components, such as the cloud storage pool 210, the content manager 214 (e.g., archive engine 216 or restore engine 217), and/or ILM 212 (e.g., policy module 218, ILM rules 219, or object tracker 322), to execute the blocks of method 400. As illustrated, the method 400 includes a number of enumerated blocks, but embodiments of the method 400 may include additional blocks before, after, and in between the enumerated blocks. In some embodiments, one or more of the enumerated blocks may be omitted or performed in a different order.

At block 402, the method 400 includes receiving, by a storage device (e.g., storage node 106) from a client, a request specifying an active time period for a data object to remain stored on an accessible tier. The storage device may track the data object in accordance with the active time period while the data object remains stored on the accessible tier. For example, the storage device may insert metadata associated with restored data objects into the distributed datastore 330.

At block 404, the method 400 includes determining, by the storage device, that the active time period has elapsed. In some examples, the storage device may scan metadata specifying a location type of the data object, a restore start timestamp indicating a start time of a restore of the data object, and a restore expiry timestamp indicating the active time period specified for the data object. The metadata may be stored on a distributed datastore remote from the storage device. The storage device may determine a re-tier timestamp based on the restore start timestamp and the restore expiry timestamp. Additionally, the storage device may determine that the active time period has elapsed in response to a determination that a current timestamp has passed the re-tier timestamp.

At block 406, the method 400 includes responsive to determining that the active time period has elapsed, sending, by the storage device, a request to a server storing the data object (e.g., a cloud endpoint 220) to move the data object from the accessible tier to an archive tier, where data objects that are stored on the accessible tier are accessible by the client and data objects that are stored on the archive tier are inaccessible by the client. The storage device may send the request by invoking an API exposed by the server. The accessible tier may be associated with a different SLA than the archive tier. A cost associated with content storage on the accessible tier may be greater than a cost associated with content storage on the archive tier (and/or performance characteristics may vary between the tiers).

In some examples, the storage device may receive from the client, a data request for the data object. Responsive to receiving the data request for the data object, the storage device may send a data request to the server for the data object and determine, based on a response from the server, that the data object is inaccessible by the client. The storage device may send to the client a message specifying that the data object is inaccessible by the client. The storage device may send the message before receiving the request from the client specifying the active time period.

The storage device may receive from the client, in response to the message specifying that the data object is inaccessible by the client, a restore request for the data object to be restored. Responsive to the restore request, the storage device may send a request to the server to move the data object from the archive tier to the accessible tier. In some examples, the storage device may send a request to the server to move the data object from the archive tier to the accessible tier. The storage device may send a request to the server for the data object and receive the data object from the server. In some examples, the storage device sends to the client a message specifying that the data object is inaccessible by the client. The request specifying the active time period may include a restore request for the data object to be restored.

Figure 5:
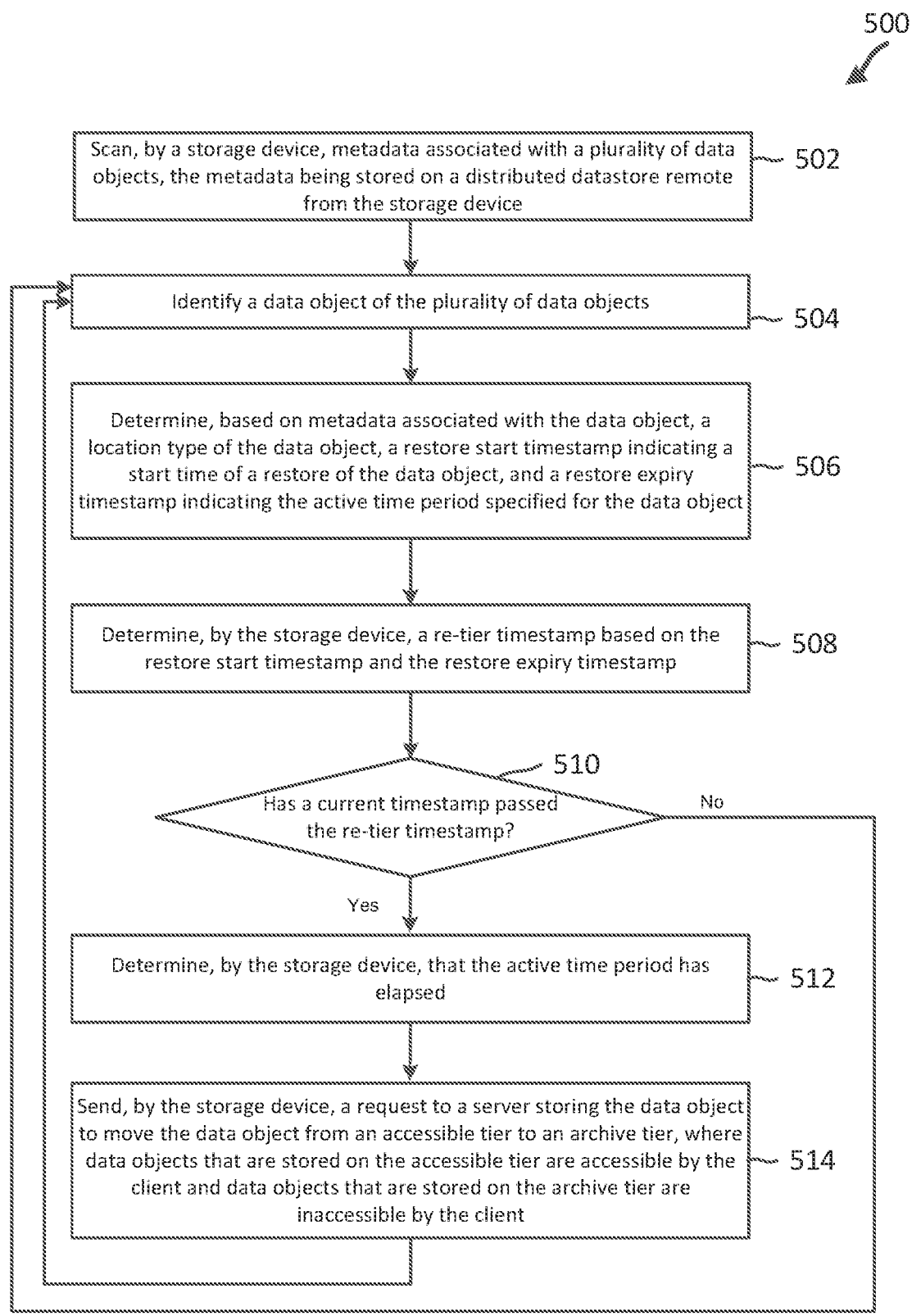
FIG. 5 is a flow diagram of a method of tracking a restored data object according to one or more aspects of the present disclosure.

FIG. 5 is a flow diagram of a method 500 of tracking a restored data object according to one or more aspects of the present disclosure. Blocks of the method 500 can be executed by a computing device (e.g., a processor, processing circuit, and/or other suitable component). For example, a storage node such as the storage node 106, may utilize one or more components, such as the cloud storage pool 210, the content manager 214 (e.g., archive engine 216 or restore engine 217), and/or ILM 212 (e.g., policy module 218, ILM rules 219, or object tracker 322), to execute the blocks of method 500. As illustrated, the method 500 includes a number of enumerated blocks, but embodiments of the method 500 may include additional blocks before, after, and in between the enumerated blocks. In some embodiments, one or more of the enumerated blocks may be omitted or performed in a different order.

At block 502, the method 500 includes scanning, by a storage device (e.g., ILM 212's object tracker 322 of a storage node 106), metadata associated with a plurality of data objects, the metadata being stored on a distributed datastore remote from the storage device. At block 504, the method 500 includes identifying a data object of the plurality of data objects. At block 506, the method 500 includes determining, based on metadata associated with the data object, a location type of the data object, a restore start timestamp indicating a start time of a restore of the data object, and a restore expiry timestamp indicating the active time period specified for the data object. At block 508, the method 500 includes determining, by the storage device, a re-tier timestamp based on the restore start timestamp and the restore expiry timestamp. At block 510, the method 500 includes determining whether a current timestamp has passed the re-tier timestamp.

If it is determined that the current timestamp has not passed the re-tier timestamp, process flow of the method 500 proceeds from the block 510 back to the block 504. If it is determined that the current timestamp has passed the re-tier timestamp, process flow of the method 500 proceeds from the block 510 to block 512. At block 512, the method 500 includes determining, by the storage device, that the active time period has elapsed. At block 514, the method 500 includes sending, by the storage device, a request to a server storing the data object to move the data object from an accessible tier to an archive tier, where data objects that are stored on the accessible tier are accessible by the client and data objects that are stored on the archive tier are inaccessible by the client. Process flow proceeds from block 514 back to the block 504.

The present embodiments can take the form of an entirely hardware embodiment, an entirely software embodiment, or an embodiment containing both hardware and software elements. Accordingly, it is understood that any operation of the computing systems of computing architecture 100 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

Thus, the present disclosure provides a system, method, and machine-readable storage medium for restoring a data object for a specified active time period in a distributed storage system. In some embodiments, the method includes receiving, by a storage device from a client, a request specifying an active time period for a data object to remain stored on an accessible tier; determining, by the storage device, that the active time period has elapsed; and responsive to a determination that the active time period has elapsed, sending, by the storage device, a request to a server storing the data object to move the data object from the accessible tier to an archive tier, wherein data objects that are stored on the accessible tier are accessible by the client and data objects that are stored on the archive tier are inaccessible by the client.

In yet further embodiments, the non-transitory machine-readable medium has instructions for performing the method of restoring a data object for a specified active time period, including machine executable code, which when executed by at least one machine, causes the machine to: receive, by a storage device from a client, a restore request identifying a data object for a restore and specifying an active time period for the data object to remain accessible via a cloud endpoint to the client; determine, by the storage device, that the active time period has elapsed; and responsive to a determination that the active time period has elapsed, send, by the storage device, a request to the cloud endpoint to move the data object to an archive tier, wherein data objects that are stored on the archive tier are inaccessible by the client.

In some examples, the client and the storage device communicate using a first protocol, and the storage device and the cloud endpoint communicate using a second protocol different from the first protocol. In some examples, the cloud endpoint includes a plurality of tiers including an accessible tier and the archive tier, and data objects that are restored are moved from the archive tier to the accessible tier for at least the active time period specified in the restore request. In some examples, the machine executable code when executed by at least one machine, causes the machine to track, by the storage device, the data object in accordance with the active time period while the data object remains accessible via the cloud endpoint.

In some examples, an ILM rule specifies the archival of a restored data object when the restored data object has been accessible for at least the active time period specified in the restore request. In some examples, the machine executable code when executed by at least one machine, causes the machine to scan, by the storage device, metadata specifying a location type of the data object, a restore start timestamp indicating a start time of a restore of the data object, and a restore expiry timestamp indicating the active time period specified for the data object, the metadata being stored on a distributed datastore remote from the storage device; and determine, by the storage device, a re-tier timestamp based on the restore start timestamp and the restore expiry timestamp, where the active time period has elapsed if a current timestamp has passed the re-tier timestamp.

In yet further embodiments, the computing device includes a memory containing a machine-readable medium comprising machine executable code having stored thereon instructions for performing a method of restoring a data object for a specified active time period and a processor coupled to the memory. The processor is configured to execute the machine executable code to: receive, by a storage device from a client, a restore request to restore a data object to an accessible tier and specifying an active time period for the data object to remain stored on the accessible tier; determine, by the storage device, whether the restored data object has been stored on the accessible tier for at least the specified active time period; and responsive to a determination that the restored data object has been stored on the accessible tier for at least the specified active time period, send, by the storage device, a request to a server storing the data object to move the data object from the accessible tier to an archive tier, wherein data objects that are stored on the accessible tier are accessible by the client and data objects that are stored on the archive tier are inaccessible by the client.

In some examples, the accessible tier is associated with a different SLA than the archive tier. A cost associated with content storage on the accessible tier may be greater than a cost associated with content storage on the accessible tier. In some examples, the server includes a plurality of tiers including the accessible tier and the archive tier, and data objects that are restored are moved from the archive tier to the accessible tier.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a storage node, the method comprising:
  receiving by the storage node a restore request that requests restoration of a data object from a first storage tier to a second storage tier, the restore request including a first indication of an active time period for the data object to remain stored to the second storage tier;
  setting a restore expiry timestamp, based on the active time period and a restore start timestamp, in response to a second indication that the first storage tier has accepted the restore request, wherein the restore start timestamp indicates a start time of the restoration of the data object to the second storage tier, and the restore expiry timestamp indicates an expiry time of the active time period for the data object remaining stored to the second storage tier;
  determining a re-tier timestamp from a combination of the restore start timestamp and the restore expiry timestamp;
  comparing a current timestamp to the re-tier timestamp to determine whether the active time period has elapsed;
  responsive to determining that the active time period has not elapsed, repeating a scan of metadata associated with a plurality of data objects including the data object and the comparing; and
  responsive to determining that the active time period has elapsed, requesting a cloud endpoint to move the data object from the second storage tier to the first storage tier.

2. The method of claim 1, further comprising:
  tracking the data object in accordance with the active time period while the data object remains stored on the second storage tier.

3. The method of claim 1, further comprising:
  sending a message to a client, the message specifying that the data object is inaccessible by the client, including sending the message before receiving the request from the client specifying the active time period.

4. The method of claim 1, further comprising:
  receiving the restore request from a client; and
  responsive to the restore request, sending a request to the cloud endpoint to move the data object from the first storage tier to the second storage tier.

5. The method of claim 4, wherein the first storage tier comprises an archive tier, and the second storage tier comprises a storage tier accessible to the client.

6. The method of claim 1, further comprising:
  periodically scanning metadata specifying a location type of the data object, the metadata including the restore start timestamp and the restore expiry timestamp, the metadata being stored on a distributed datastore remote from the storage node.

7. The method of claim 6, wherein the location type of the data object indicates that the data object is stored in the second storage tier.

8. The method of claim 1, wherein the cloud endpoint includes the first storage tier and the second storage tier.

9. A storage node comprising:
  a memory containing a machine-readable medium comprising machine executable code having stored thereon instructions for performing a method of restoring a data object; and
  a processor coupled to the memory, the processor configured to execute the machine executable code to:
    set a restore expiry timestamp in response to indication that a cloud endpoint has accepted a restore request for the data object to be accessible on a first storage tier, the restore expiry timestamp indicating an expiry time of an active time period for the data object and being based on the active time period and a restore start timestamp;
    determine a re-tier timestamp from a combination of the restore start timestamp and the restore expiry timestamp, the restore start timestamp indicating a start time of a restore of the data object;
    compare a current timestamp to the re-tier timestamp to determine whether the active time period has elapsed;
    responsive to a determination that the active time period has not elapsed, repeat a scan of metadata associated with a plurality of data objects including the data object and the comparison; and
    responsive to a determination that the active time period has elapsed, request the cloud endpoint to move the data object to a second storage tier, wherein data objects that are stored on the second storage tier are inaccessible by a client.

10. The storage node of claim 9, wherein the processor is further configured to execute the machine executable code to:
  send, to the client, a message specifying that the data object is inaccessible by the client, wherein the client is external to the storage node.

11. The storage node of claim 10, wherein the processor is further configured to execute the machine executable code to:
  receive, from the client, the restore request identifying the data object for a restore and specifying the active time period for the data object to remain accessible.

12. The storage node of claim 9, wherein the client and the storage node communicate using a first protocol, and the storage node and the cloud endpoint communicate using a second protocol different from the first protocol.

13. The storage node of claim 9, wherein the cloud endpoint has a plurality of storage tiers including the first storage tier and the second storage tier.

14. The storage node of claim 9, wherein the processor is further configured to execute the machine executable code to:
  track, the data object in accordance with the active time period while the data object remains accessible on the first storage tier.

15. The storage node of claim 9, wherein an information lifecycle management (ILM) rule specifies archival of the data object.

16. The storage node of claim 9, wherein the processor is further configured to execute the machine executable code to:
  periodically scan the restore start timestamp, the restore expiry timestamp, and metadata specifying a location type of the data object, wherein the location type indicates that the data object is stored on the first storage tier, and the metadata is stored on a distributed datastore remote from the storage node.

17. A non-transitory machine-readable medium having stored thereon instructions for performing a method of managing information lifecycle management (ILM) for a data object, comprising machine executable code which when executed by at least one machine, causes the machine to:
  set a restore expiry timestamp in response to indication that a cloud endpoint hosting a first storage tier has accepted a restore request to make the data object accessible on the first storage tier, the restore expiry timestamp specifying an expiry time of an active time period for the data object, the restore expire timestamp further being based on the active time period and a restore start timestamp that indicates a start time of a restore of the data object;
  determine a re-tier timestamp from a combination of the restore start timestamp and the restore expiry timestamp;
  compare a current timestamp to the re-tier timestamp to determine whether the active time period has elapsed, indicated by the current time stamp being past the re-tier timestamp;
  responsive to the data object having been stored on the first storage tier for less than the active time period, repeat a scan of metadata associated with a plurality of data objects including the data object and the comparison; and
  responsive to the data object having been stored on the first storage tier for at least the active time period, request the cloud endpoint to move the data object from the first storage tier to a second storage that is inaccessible by a client.

18. The non-transitory machine-readable medium of claim 17, wherein the cloud endpoint has a plurality of tiers including the first storage tier and the second storage tier.

19. The non-transitory machine-readable medium of claim 17, wherein the machine executable code causes the machine to:
  periodically track the data object in accordance with the active time period while the data object remains stored on the first storage tier.

20. The non-transitory machine-readable medium of claim 19, wherein periodically tracking the data object includes scanning the restore start timestamp, the restore expiry timestamp, and metadata specifying a location type of the data object, wherein the location type indicates that the data object is stored on the first storage tier.

21. The method of claim 4, further comprising:
  subsequent to sending the request to the cloud endpoint to move the data object, receiving the indication, from the cloud endpoint, that the first storage tier has accepted the restore request.

* * * * *